United States Patent [19]

Nichols

[11] Patent Number: 5,190,242
[45] Date of Patent: Mar. 2, 1993

[54] MODEL JET HELICOPTER WITH SOLID-CIRCULAR ROTOR BLADE

[76] Inventor: Edward H. Nichols, 166 Canonchet Dr., Portsmouth, R.I. 02871

[21] Appl. No.: 451,645

[22] Filed: Dec. 18, 1989

[51] Int. Cl.5 .......................................... B64C 27/22
[52] U.S. Cl. ............................ 244/12.2; 244/34 A; 244/39; 244/17.11; 244/17.23; 244/6
[58] Field of Search ...................... 244/23 C, 34 A, 39, 244/17.11, 17.23, 73 B, 73 C, 12.2, 6, 17.25; 446/36, 37, 46

[56] References Cited

U.S. PATENT DOCUMENTS

| D. 232,183 | 7/1974 | Reed | 244/17.11 |
| 996,366 | 6/1911 | Roberts | 244/73 C |
| 1,877,902 | 9/1932 | Kuethe | 244/6 |
| 2,036,011 | 3/1936 | Barrett | 244/39 |
| 2,611,557 | 9/1952 | Donovan | 244/17.11 |
| 2,638,707 | 5/1953 | Baker | 244/17.25 |
| 3,072,197 | 1/1963 | Stahmer | 244/6 |
| 3,129,905 | 4/1964 | Taylor | 244/210 C |
| 3,253,805 | 5/1966 | Taylor | 244/12.2 |
| 3,351,304 | 11/1967 | Stein et al. | 244/17.19 |
| 4,301,981 | 11/1981 | Hartt | 244/12.2 |
| 4,307,856 | 12/1981 | Walker | 244/12.2 |
| 4,312,483 | 1/1982 | Bostan | 244/12.2 |

FOREIGN PATENT DOCUMENTS 2581613 11/1986 France ............................ 244/17.11

Primary Examiner—Joseph F. Peters, Jr.
Assistant Examiner—Linda L. Palomar
Attorney, Agent, or Firm—Leon Gilden

[57] ABSTRACT

An elongate helicopter body including an orthogonally mounted rotatable and pivotally positionable rotor shaft fixedly mounting a solid, annular, convex blade member defined by a parabolic convex curve and terminating in an annular rim, wherein the rim is aligned generally orthogonal to the rotor shaft. Propulsion is provided by an enclosed $CO_2$ cartridge, or alternatively a propulsion propeller in alignment with the body of the helicopter. Modifications of the instant invention include a lift propeller mounted underlying or overlying the solid blade and is of a generally equal diameter to that defined by the blade.

1 Claim, 4 Drawing Sheets

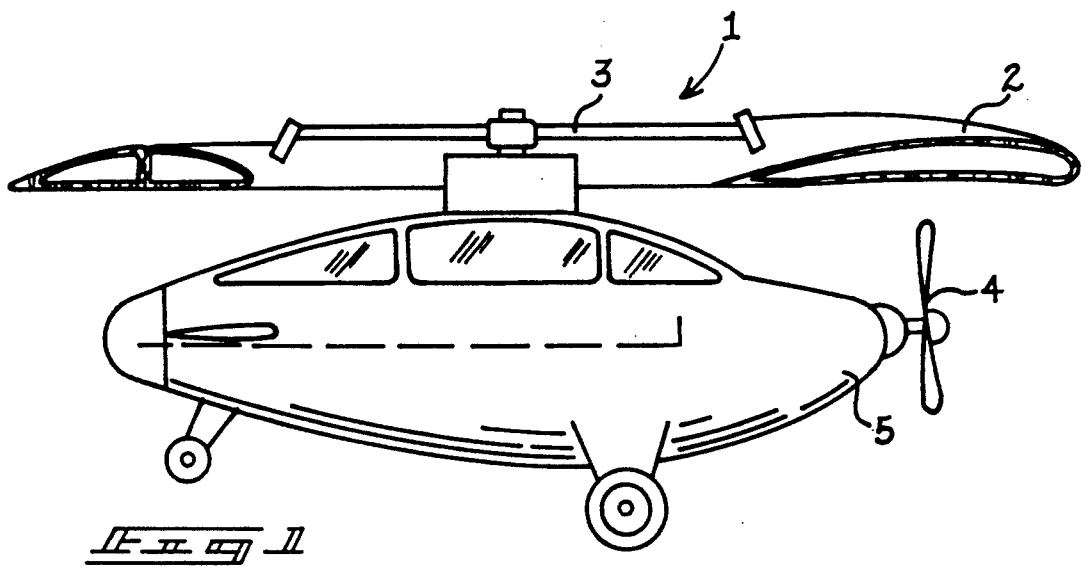
Fig 1 PRIOR ART
PRIOR ART
Fig 2
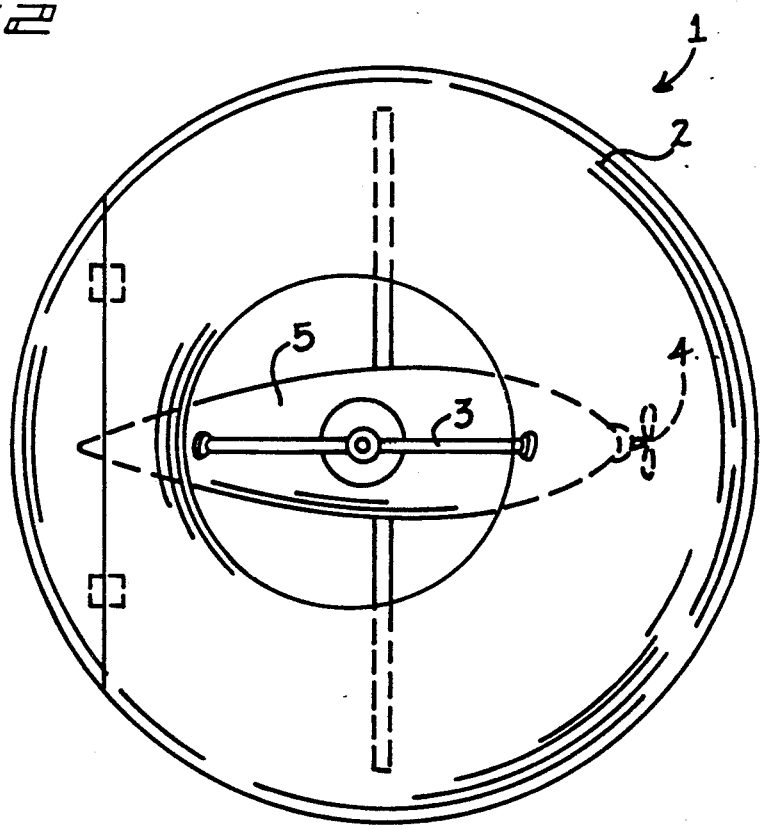

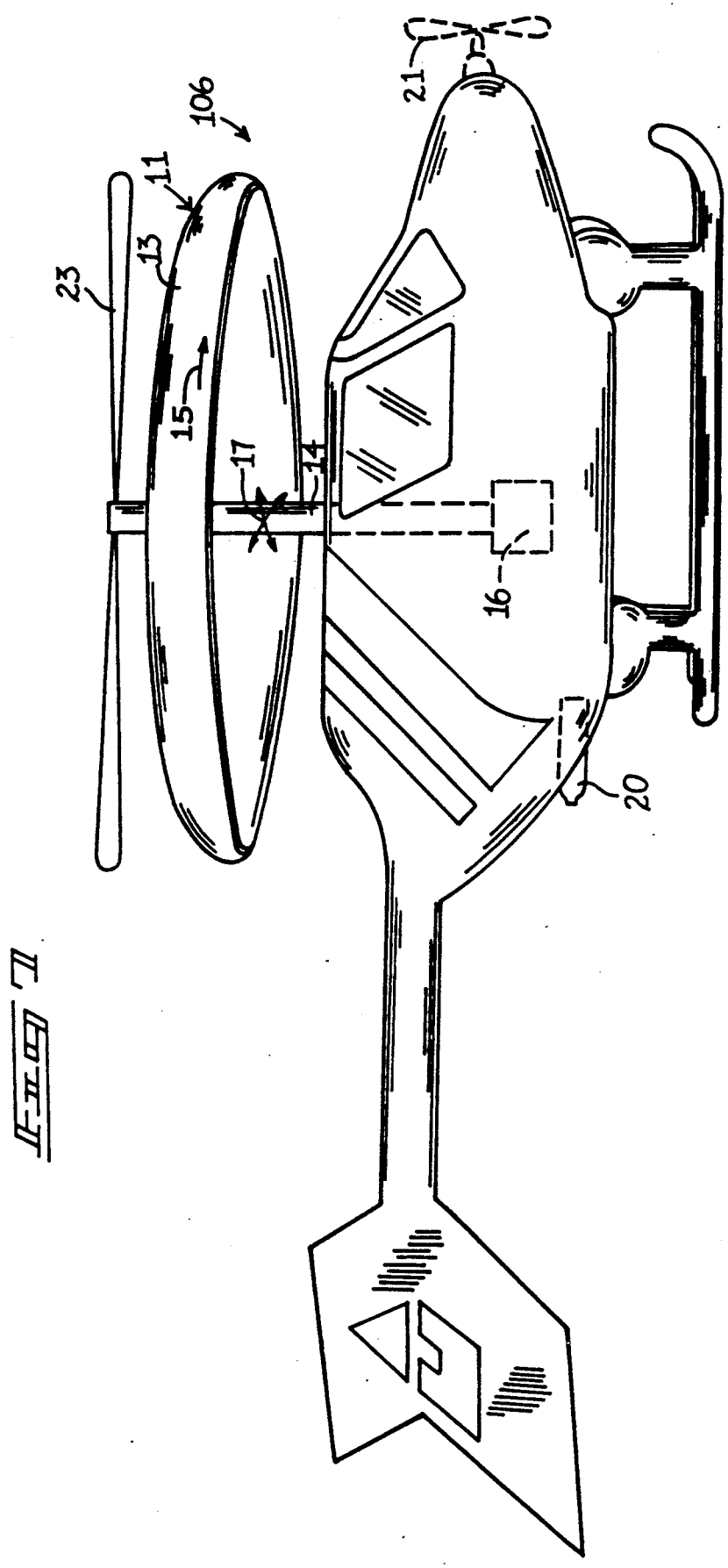

MODEL JET HELICOPTER WITH SOLID-CIRCULAR ROTOR BLADE

BACKGROUND OF THE INVENTION

1. Field of the Invention

The field of invention relates to helicopter arrangements, and more particularly pertains to a new and improved model jet helicopter with solid-circular rotor blade wherein the same utilizing typical jet propulsion cooperates therewithin, whereupon pivotment of the solid annular blade member permits maneuvering of the helicopter during flight.

2. Description of the Prior Art

Helicopter assemblies of the prior art have typically utilized a lift propeller and a stabilizing propeller mounted to the body and to the rearwardly positioned tail member respectively. The use of such helicopter, and particularly model helicopter arrangements, enable traditional lift and maneuverability of a helicopter organization in forms of limited take-off and landing strips. The instant invention imparts added stability of the solid disk blade in cooperation with a helicopter assembly to enhance typical helicopter characteristics in use. Examples of prior art helicopter devices includes U.S. Pat. No. 3,253,805 to Taylor wherein a helicopter-type aircraft utilizes a fixed annular air foil wing with a lift propeller arrangement mounted coaxially and aligned with the wing to provide lift to the organization.

U.S. Pat. No. 4,307,856 to Walker provides a fixed annular wing aircraft wherein the wing is a rapid annular unit of substantially uniform symmetrical configuration to provide a lifting force in use with a propulsion mechanism, such as a propeller arrangement.

U.S. Pat. No. 4,312,483 to Boston sets forth a circular wing aircraft wherein the circular wing is aligned with the body of the aircraft for lift thereof, wherein furthermore the disk may be provided for rotation to effect a gyroscopic lifting of the aircraft in use.

U.S. Pat. No. 4,301,981 to Hartt provides an aircraft with an annular wing having an air foil shape and rotatable in coordination with a rearwardly directed propeller arrangement to provide lift to the aircraft, wherein the wing defines an open annulus in configuration.

U.S. Pat. No. 3,129,905 to Taylor sets forth an aircraft with an arcuate wing defined as a ring-like member rotatable to provide lift to the associated helicopter assembly.

As such, it may be appreciated that there is a continuing need for a new and improved helicopter arrangement wherein the same addresses both the problems of gyroscopic stability and maneuverability in use with the helicopter arrangement and in this respect, the present invention substantially fulfills this need.

SUMMARY OF THE INVENTION

In view of the foregoing disadvantages inherent in the known types of helicopter apparatus now present in the prior art, the present invention provides a jet helicopter with solid-circular rotor blade to effect lift and gyroscopic stability to the aircraft and maneuverability thereof in the pivotment of the wing relative to the aircraft. As such, the general purpose of the present invention, which will be described subsequently in greater detail, is to provide a new and improved helicopter with solid-circular rotor blade which has all the advantages of the prior art helicopter apparatus and none of the disadvantages.

To attain this, the present invention includes an elongate helicopter body including an orthogonally mounted, rotatable and pivotally positionable rotor shaft fixedly mounting a solid, annular, convex blade member defined by a parabolic convex curve and terminating in an annular rim, wherein the rim is aligned generally orthogonal to the rotor shaft. Propulsion is provided by an enclosed $CO_2$ cartridge, or alternatively a propulsion propeller in alignment with the body of the helicopter. Modifications of the instant invention include a lift propeller mounted underlying or overlying the solid blade and is of a generally equal diameter to that defined by the blade.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved jet helicopter arrangement with solid-circular rotor blades which has all the advantages of the prior art helicopter apparatus and none of the disadvantages.

It is another object of the present invention to provide a new and improved jet helicopter arrangement with solid-circular rotor blades which may be easily and efficiently manufactured and marketed.

It is a further object of the present invention to provide a new and improved jet helicopter arrangement with solid-circular rotor blades which is of a durable and reliable construction.

An even further object of the present invention is to provide a new and improved jet helicopter arrangement with solid-circular rotor blades which is susceptible of a low cost of manufacture with regard to both materials and labor, and which accordingly is then susceptible of low prices of sale to the consuming public, thereby making such jet helicopter arrangement with solid-circular rotor blades economically available to the buying public.

Still yet another object of the present invention is to provide a new and improved jet helicopter arrangement with solid-circular rotor blades which provides in the apparatuses and methods of the prior art some of the advantages thereof, while simultaneously overcoming some of the disadvantages normally associated therewith.

Still another object of the present invention is to provide a new and improved jet helicopter arrangement with solid-circular rotor blades wherein the same imparts gyroscopic stability and maneuverability in its rotation and pivotment of the blade relative to the associated aircraft.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawing wherein:

FIG. 1 is an orthographic side view of a prior art winged helicopter apparatus.

FIG. 2 is a top orthographic view of the prior art assembly, as illustrated in FIG. 1.

FIG. 7 is an orthographic side view of a yet further modified solid-circular rotor blade helicopter apparatus utilized by the instant invention.

DESCRIPTION OF THE PREFERRED EMBODIMENT

Figure 3:
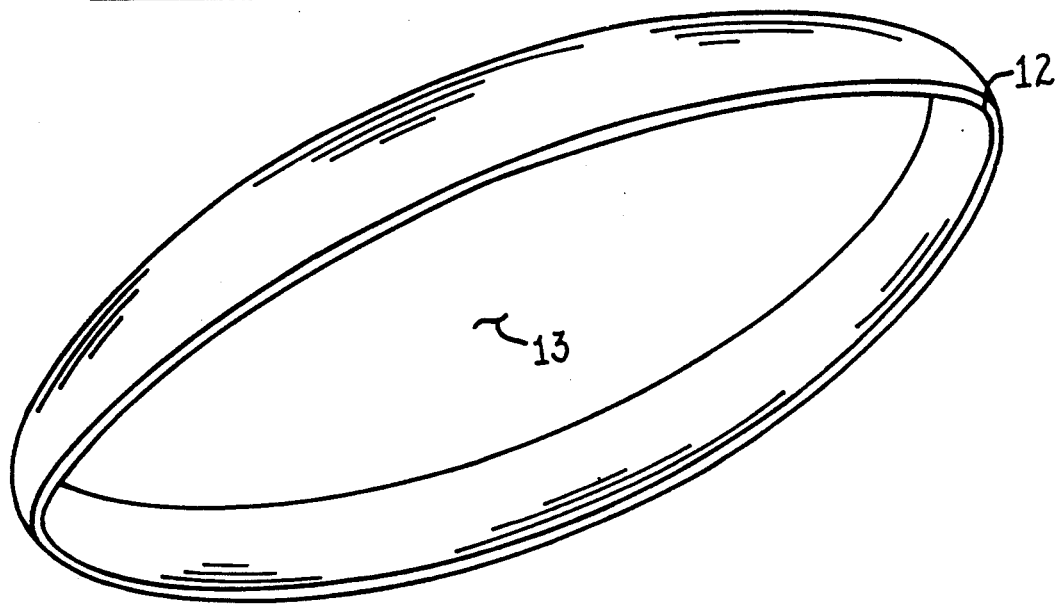
FIG. 3 is an isometric illustration of the solid-circular rotor blade of the instant invention.
Figure 4:
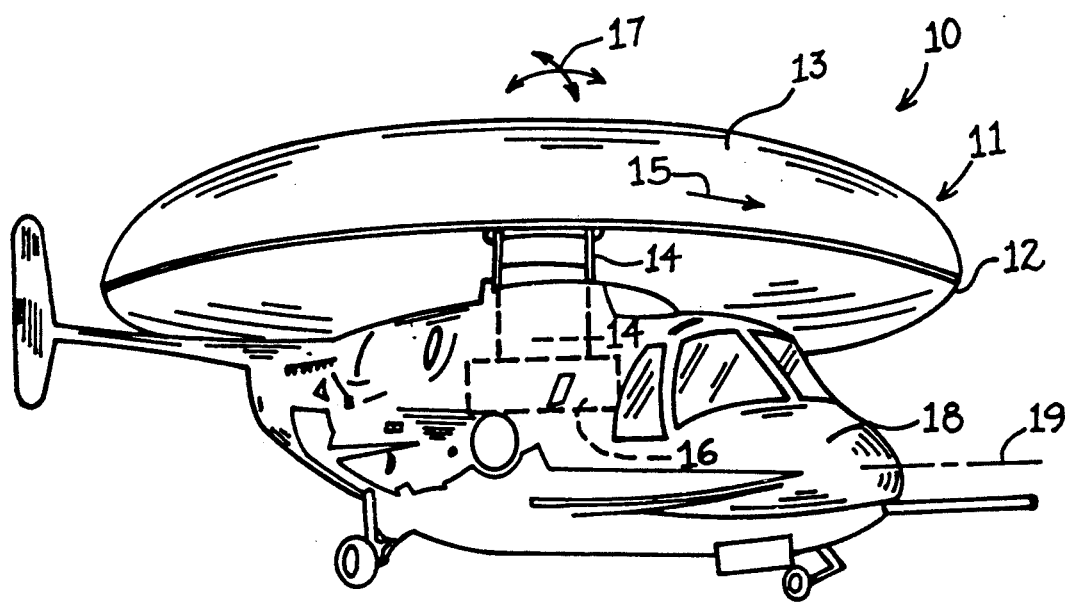
FIG. 4 is an isometric illustration of the rotor blade in association with a helicopter assembly.
Figure 5:
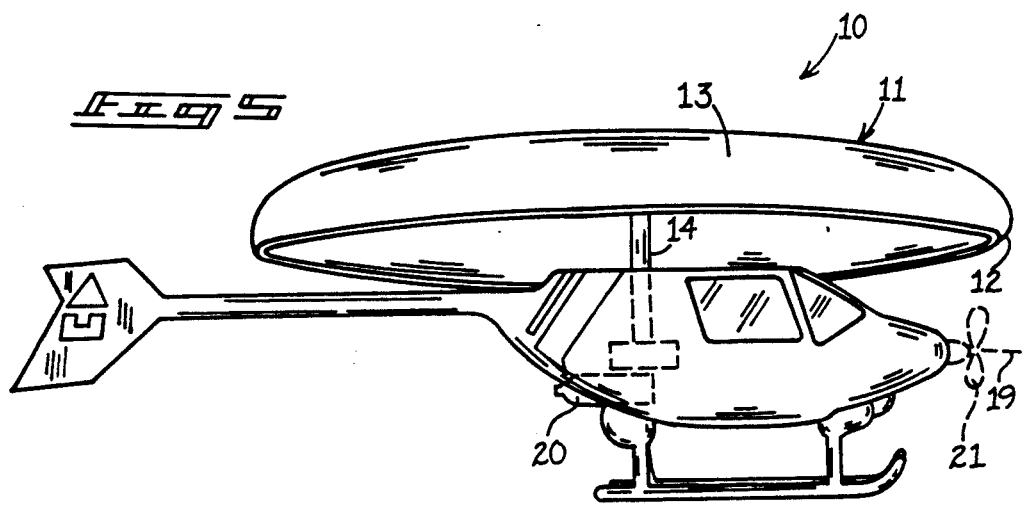
FIG. 5 is an orthographic side view of the instant invention.

With reference now to the drawings, and in particular to FIGS. 1 to 7 thereof, a new and improved model jet helicopter with solid-circular rotor blade embodying the principles and concepts of the present invention and generally designated by the reference numerals 10, 10a, and 10b will be described.

FIGS. 1 and 2 illustrate a prior art helicopter arrangement 1 wherein a fixed blade 2 is defined as an annular ring with a central opening with a rotary lifting blade 3 rotatable therewithin. The fixed wing 2 is provided with a rear elevator portion to effect maneuvering of the aircraft with a forwardly mounted propeller arrangement 4 mounted to a forward end of the fuselage 5 to effect propulsion of the aircraft.

More specifically, the helicopter arrangement 10 of the instant invention essentially comprises an elongate axially aligned helicopter body symmetrically arranged about longitudinal axis 19, including an annular blade 11 fixedly mounted to a rotatable rotor shaft 14 that is mounted to a drive motor and pivot junction 16 to enable pivotment of the rotor shaft 14 to provide directional turning ability and maneuverability of the aircraft, with pivotment of the rotor shaft 14 about the drive motor and pivot junction 16 in the direction of the directional arrows 17, and simultaneously enabling rotation of the rotor shaft 14 in the direction of the rotation arrow 15 to effect rotation of the annular blade member 11 to provide gyroscopic stability to the aircraft during flight. The annular blade member 11 is defined by a convex parabolic exterior surface with a complementary convex interior surface, wherein the solid dome 13 terminates in an annular periphery 12 that is aligned generally orthogonally relative to the rotor shaft 14.

Propulsion of the aircraft is effected by jet assembly 20, which for model purposes may comprise a $CO_2$ cartridge, or plurality thereof. Additionally, a propulsion propeller assembly 21 is mounted in an axial aligned relationship relative to the longitudinal axis 19 to effect propulsion of the aircraft while the solid annular blade member 11 effects gyroscopic lift and stability thereto.

Figure 6:
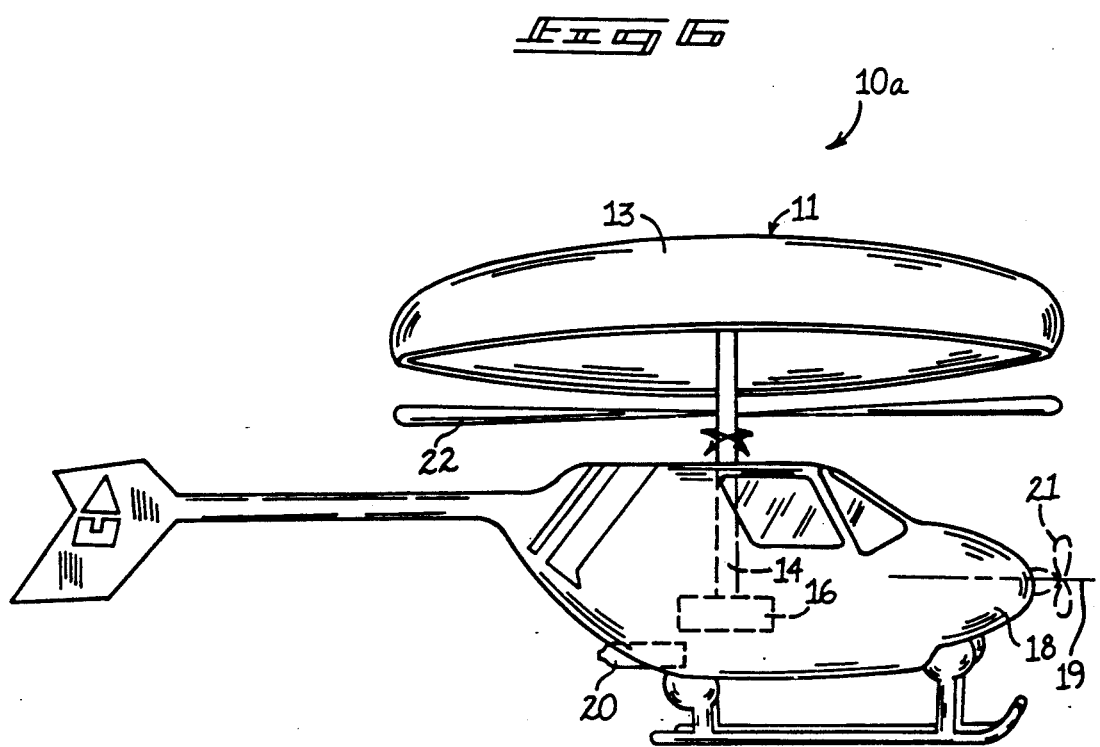
FIG. 6 is an orthographic side view of a modified assembly.

FIG. 6 illustrates a modified assembly wherein a lift propeller assembly 22 is defined as a plurality of aligned blades defining a diameter substantially equal to that of the annular blade member 11 to enhance lift of the organization. The lift propeller assembly 22 is positioned medially between an upper surface of the helicopter body 18 and the annular peripheral edge 12 orthogonally to the rotor shaft 14.

Reference to FIG. 7 illustrates a further modified helicopter assembly 10b wherein a modified lift propeller assembly 23 of a configuration substantially equal to that as illustrated in FIG. 6 positioned overlying the annular blade illustrated in FIG. 6 is positioned overlying the annular blade member 11 and is, as in the embodiment of FIG. 6, substantially equal in diameter to that defined by the annular blade member 11 to enhance lift and minimize turbulence in the combination.

It is further contemplated that conventional ground level control unit organization may be provided with an electric speed controller and conventional direct circuit ampmeter for effecting control of solenoids mounted within the helicopter body 18 to control valving of conventional construction effecting release of discharge of the propulsion engine 20. Electric control of the pivotment of the rotor shaft 14 may also be thusly effected by use of radio control equipment utilized in the field.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawing and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A model aircraft arranged for vertical, horizontal, and hovering flight, comprising in combination, an elongate fuselage symmetrically arranged about a longitudinal axis, and a forward thrust means mounted parallel to the longitudinal axis on the fuselage for providing forward thrust to the fuselage, and a unitary solid blade member fixedly mounted to a rotor shaft, the rotor shaft mounted for rotation interiorly of the fuselage and orthogonally arranged relative to the longitudinal axis, and the rotor shaft extending exteriorly above an upper surface of the fuselage, and wherein the solid blade is defined with an annular peripheral edge, the annular peripheral edge arranged orthogonally relative to the rotor shaft, and the solid blade member defined as a convex parabolic unitary surface arranged exteriorly of the fuselage including a convex interior surface complementary to that define by the exterior surface, and wherein the rotor shaft includes pivot means to enable pivotment of the rotor shaft relative to the fuselage to effect maneuvering of the fuselage, as well as providing gyroscopic stability to the aircraft, and wherein the forward thrust means comprises at least one jet propulsion device, and wherein the forward thrust means further includes a propeller assembly aligned with the longitudinal axis, wherein the propeller assembly is arranged orthogonally relative to the longitudinal axis and mounted to a forward end of the fuselage, and further including a lift propeller assembly mounted orthogonally to the rotor shaft underlying the blade member, wherein the lift propeller assembly is defined by a diameter substantially equal to that defined by the blade member.

* * * * *